G. C. DE BAY.
APPARATUS FOR MAKING POLISHED GLASS.
APPLICATION FILED MAY 26, 1909.
972,166.
Patented Oct. 11, 1910.
4 SHEETS—SHEET 1.
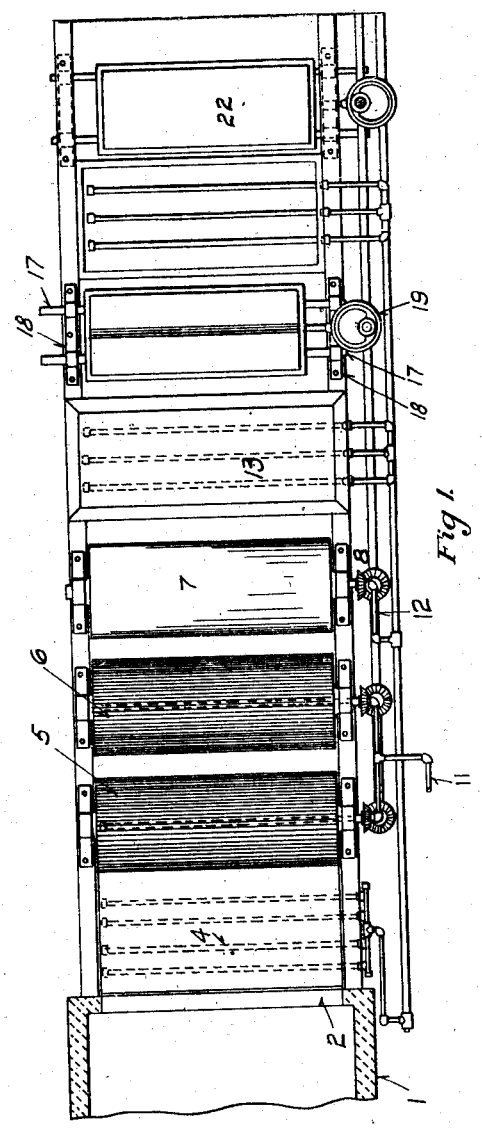
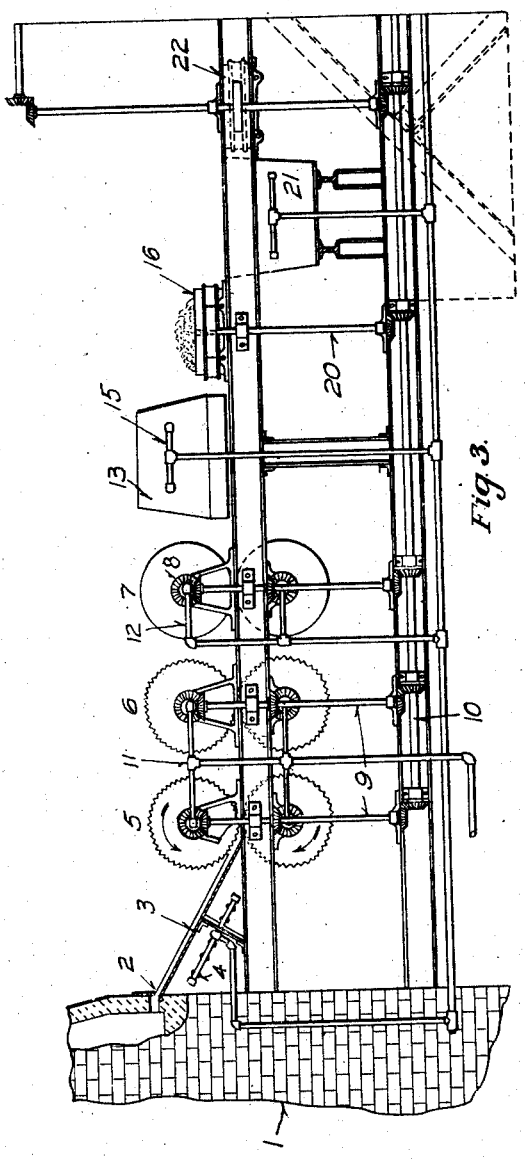

G. C. DE BAY.
APPARATUS FOR MAKING POLISHED GLASS.
APPLICATION FILED MAY 26, 1909.

972,166.

Patented Oct. 11, 1910.
4 SHEETS—SHEET 2.

WITNESSES
Stephen Wach

INVENTOR
George C. DeBay.
By Fred'k W. Winter
Attorney.

G. C. DE BAY.
APPARATUS FOR MAKING POLISHED GLASS.
APPLICATION FILED MAY 26, 1909.

972,166.

Patented Oct. 11, 1910.

4 SHEETS—SHEET 3.

WITNESSES

INVENTOR

G. C. DE BAY.
APPARATUS FOR MAKING POLISHED GLASS.
APPLICATION FILED MAY 26, 1909.
972,166.
Patented Oct. 11, 1910.
4 SHEETS—SHEET 4.
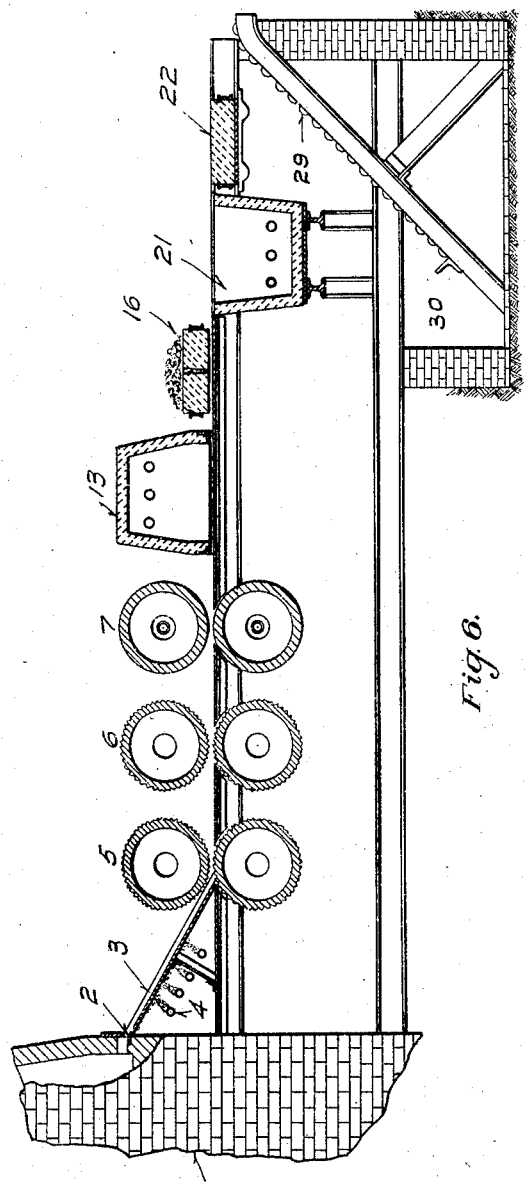

UNITED STATES PATENT OFFICE.

GEORGE C. DE BAY, OF TARENTUM, PENNSYLVANIA, ASSIGNOR OF ONE-HALF TO JOSEPH HEIDENKAMP, OF SPRINGDALE, PENNSYLVANIA.

APPARATUS FOR MAKING POLISHED GLASS.

972,166. Specification of Letters Patent. Patented Oct. 11, 1910.

Application filed May 26, 1909. Serial No. 498,554.

*To all whom it may concern:*

Be it known that I, GEORGE C. DE BAY, a resident of Tarentum, in the county of Allegheny and State of Pennsylvania, have invented a new and useful Improvement in Apparatus for Making Polished Glass, of which the following is a specification.

This invention relates to apparatus for making polished plate glass in an expeditious and economical manner and so as to dispense with the grinding or polishing usually employed in making this character of glass.

The essential feature of the apparatus comprises means for forming a plate of glass, together with means for fire finishing or polishing both surfaces of the plate, and means for afterward supporting and conveying the plate to prevent clouding, marring or injuring the glazed or polished surfaces.

Figure 2:
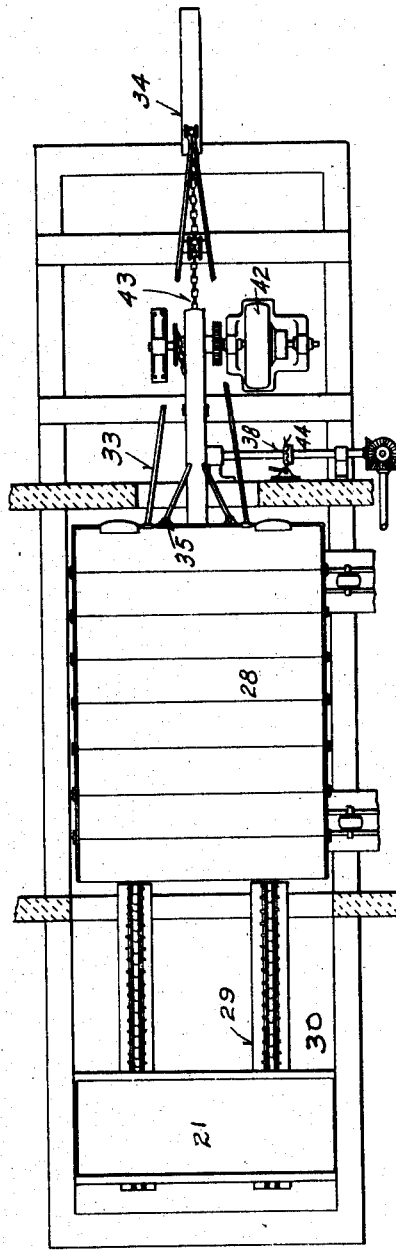
Figure 4:
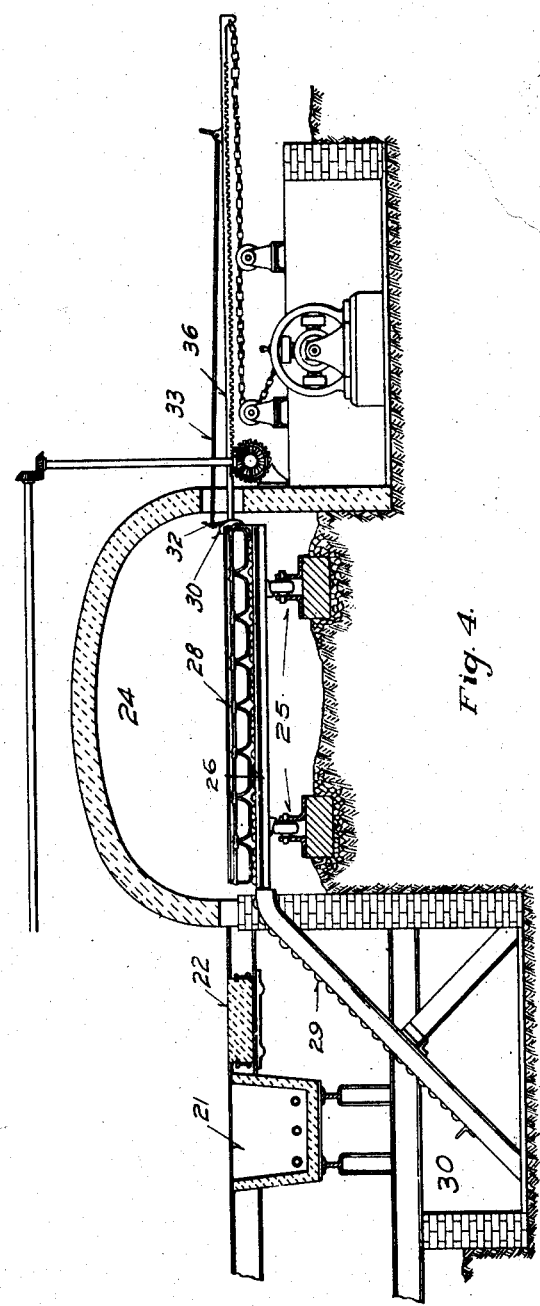
Figure 5:
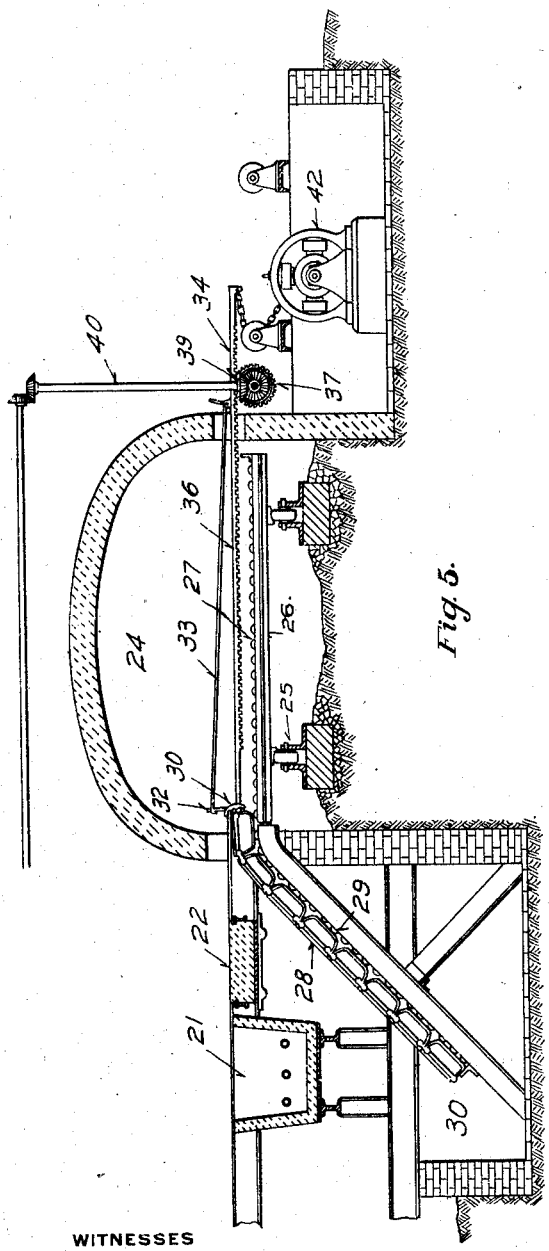
Figure 7:
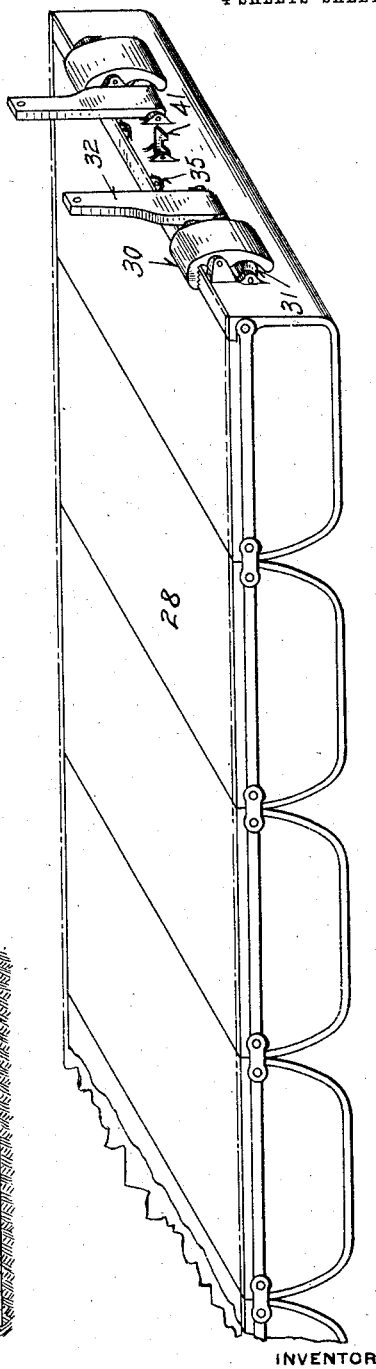

In the accompanying drawings Figures 1 and 2 are plan views partly in horizontal section of the improved apparatus; Fig. 3 is a side elevation of the plate forming part of the apparatus; Fig. 4 is a vertical section of a part of the plate forming mechanism and the receiving mechanism; Fig. 5 is a view similar to Fig. 4 showing part of the mechanism in a different position from that shown in Fig. 4; Fig. 6 is a longitudinal transverse section of the plate forming mechanism; and Fig. 7 is a perspective view of a portion of a plate carrying platform.

In an application of even date herewith, Serial No. 498,553 is described and claimed a method of forming polished plate glass by fire finishing the surface thereof so as to give the same a high polish and thus dispense with the usual grinding and polishing which has heretofore been practiced in the manufacture of glass of this character. The apparatus of this application is one form of apparatus for carrying into effect said method.

In the drawings 1 represents any form of glass melting furnace which may be either a tank furnace or a pot furnace. This furnace is represented as having a tank provided with a narrow horizontal slot or opening 2 controlled by a suitable cut-off gate or valve through which the molten glass can flow in a thin broad stream so practically forming a sheet. This stream passes down over a chute 3 which is kept hot by means of burners 4 or other suitable means so as to keep the glass in the plastic condition and so that it will flow freely. The chute 3 is located above one end of a suitable table and at the lower end of said chute are arranged a number of sets of plate forming rolls, one roll of each set being above the table and the other below the table and projecting through an opening in said table.

The rolls 5 of the first pair are longitudinally fluted or corrugated, as shown, so as to take a good grip on the plastic metal and feed the same forwardly. The rolls 6 of the second pair are likewise fluted or corrugated for a similar purpose, but the rolls 7 of the last pair are smooth so as to smooth out the corrugations or ridges formed in the plastic sheet by the first two pairs of rolls. These rolls may be driven by any suitable mechanism, the drawings showing for this purpose bevel gears 8 on the roll shafts meshing with similar gears on vertical shafts 9 which in turn are connected by bevel gearing to a horizontally driven shaft 10 extending along the table and receiving power from any suitable source, not shown. These various pairs of rolls are driven at substantially the same peripheral speeds and serve to flatten out the stream of plastic metal and form the same into a sheet of uniform thickness. The first pair of rolls is cooled, such as by the internal water pipe 11, and the second pair of rolls may also be cooled as shown in order to set the glass sheet or plate. The last pair of rolls 7 is preferably heated as by means of an internal gas pipe 12 to keep up the heat of the surfaces of the glass, although it is desirable and in fact necessary that the body of the plate shall be fairly stiff or rigid by the time it leaves the last pair of rolls.

Adjacent to the last pair of rolls is apparatus for fire polishing the upper surface of the plate. This comprises a furnace 13 located above the table and supplied with heat from any suitable source, such as by means of burners 14, supplied from the gas pipe 15. This furnace is lined with fire brick or other suitable fire resisting material. The bottom of the furnace is open and is located slightly above the table so as to permit the plate to pass over the table and underneath said furnace. It is not intended that the flame shall strike the plate, but the entire interior of the furnace will be at a white heat or what may be termed a glory-hole heat which quickly melts a skin on the top surface of the plate, which when it cools forms the smooth glazed surface known as fire polish. The melting of the surface of the plate is liable to leave the same slightly waved or undulating, or the surface may be irregular from other causes, which if allowed to remain would give the plate the appearance of plain window glass, and unfit the same for uses to which polished plate glass is ordinarily put, without grinding or polishing to remove such waves or undulations, which grinding or polishing I wish to avoid. To take out any waves, undulations or other irregularities, the surface of the plate while still plastic is subjected to a smoothing action by means of a rubbing block 16 which is caused to rub very lightly over the surface, sufficient to smooth out the irregularities and undulations, but without disturbing the molten surface or in any way destroying or marring the glaze. This rubbing block is supported and guided at its ends by means of projections 17 sliding in bearings 18 so that it contacts only lightly with the surface of the glass, and is reciprocated by means of an eccentric 19 on vertical shaft 20 driven from the horizontal shaft 10. This rubbing block may be of any suitable material which does not adhere to hot glass and which can be heated so as not to too quickly chill the surface of the plate and which is perfectly non-porous and smooth so it does not disturb the hot surface and affect the glaze. Various substances for this purpose can be used, but I prefer to use some fine smooth carbonaceous matter, such as charflake, together with a suitable cementing material or binder therefor, such as plaster of paris. This particular composition is claimed in an application of even date herewith, Serial No. 498,555.

After leaving the smoothening block 16 the plate is fire finished on its lower surface, this being accomplished by locating underneath the table a furnace 21 similar to furnace 13 except that it is open at the top instead of the bottom, and immediately following this is arranged another reciprocating smoothening block 22 similar to the block 16 and reciprocated in the same manner, said block 22 being held by its guide projections in position to engage the lower surface of the plate. The top or supporting surface of the table ends between the smoothening block 16 and lower furnace 21, so that thereafter the bottom surface of the plate is not in contact with anything except with the polishing block 22, as contact with any other substance while hot would destroy the glaze or polish on the lower face.

A plate formed in the manner described, that is, directly from the molten glass, must be annealed, and the annealing and handling must be accomplished in a manner not to destroy, mar or injure the glaze, and this is particularly likely to occur on the bottom face of the plate, on which it must be supported. To prevent this I have provided suitable supporting and conveying means for the plate which prevents all injury to the lower polished surface thereof. This supporting and conveying means is shown in conjunction with the annealing oven or leer which is indicated at 24 and extends at right angles to the course of the plate through the forming and polishing apparatus, but it will be understood that the leer could be located at any other place and the support and conveyer moved into and through the same without departing from the spirit of my invention.

As illustrated, the leer is provided with tracks 25 upon which moves the leer conveyer in the form of a series of wagons or carriages 26. On the top surface of each carriage are tracks or the like 27 extending at right angles to the tracks 25 and serving to support the movable top or plate supporting platform 28. The latter is shown as formed in a series of sections suitably hinged together and movable transversely of the carriage or wagon. At a point opposite the plate forming and polishing mechanism the leer is provided with openings in its opposite side walls and on the side toward the plate forming and polishing means there is provided a pit 30 into which the sectional platform 28 of the carriages can move when said platform is pushed over toward that side, said platform projecting down into said pit and being supported on tracks 29 therein. This platform is moved over far enough so that the end of the plate will meet the last one of the sections thereof, and the edge of said plate may then be clamped to said platform, such as by means of a clamp 30 which can be actuated by the cam 31, on lever 32 to which is attached the operating rod 33. Suitable means are provided for then pulling the platform in the opposite direction so as to draw it up onto the carriage, this means being shown as a bar 34 having a detachable connection at 35 with the outermost section of the sectional platform 28 and provided with rack teeth 36 which are engaged by a gear 37 on shaft 38 which is driven from the same source as shaft 10, being shown geared to said shaft 10 by means of bevel gears 39 and shaft 40 extending up over the leer. This is desirable in order that the sectional platforms of the carriages may be moved at the same rate of speed as the forward movement of the plate, so that the plate is delivered onto the moving sectional platform at exactly the speed of travel of the plate, thus preventing all relative movement between the plate and said platform and preventing scratching or otherwise marring the polished lower face of the plate. As soon as said platform is drawn fully onto the carriage it is clamped thereon by means of a lock 41 after which the rack bar 36 is disconnected therefrom and said carriage moved slowly through the leer or to any other suitable place for annealing or otherwise treating the plate. The sectional platform 28 of the carriage is moved over into the pit by means of a motor 42 and a chain or cable 43 connecting a drum driven by said motor with rack bar 34. This means is provided so as to get a quick movement of the platform and because the driving shaft is always driven in one direction so that the gear 37 is not reversible without the addition of a special reversing gear. A clutch 44 is provided for throwing the gear 37 out when the rack bar is being pushed inwardly.

The platform 28 which supports the plate is preferably formed of a mixture of char-flake and plaster of paris, as heretofore described in connection with the smoothening blocks, which substances I have found does not cloud or mar the polished lower surface of the plate even though the latter is received on said support while still quite hot.

Any suitable form of leer may be employed. The particular carriage with sectional top described is adapted to convey the plate either through the leer or to any other suitable place. The leer itself is not claimed in this application, nor specifically described or disclosed, but is described and claimed in an application of even date herewith, Serial No. 498,556.

The operation of the apparatus as described will be readily understood from the foregoing description. By means thereof it is possible to make plate glass of uniform thickness and with absolutely smooth and flat surfaces and having a high glaze or polish thereon, said plates in all particulars being of a quality as good as that of plate glass made according to old processes, or if anything having a higher glaze or polish thereon. By means of the apparatus described such plates can be made quickly and at a comparatively small cost.

What I claim is:

1. Apparatus for making polished glass, comprising a heater arranged to fire polish the surface of the glass, a rubbing device, means for supporting and guiding said rubbing device to cause the same to move in a fixed plane, and means for moving said rubbing device over the surface of the glass and in contact therewith.

2. Apparatus for making polished glass, comprising plate forming and moving mechanism, a heater arranged to fire polish the surface of the plate, a rubbing device, supporting and guiding means for said rubbing device arranged to cause the same to move in a fixed plane, and mechanism for reciprocating said rubbing device in contact with the surface of the glass.

3. Apparatus for making polished glass comprising plate forming and moving mechanism, a heater on each side of the course of the plate, a rubbing device, supporting and guiding means for said rubbing device arranged to cause the same to move in a fixed plane, and mechanism for moving said rubbing device over the surface of the plate and in contact therewith.

4. Apparatus for making polished glass, comprising a table, rolls coöperating therewith and arranged to form the molten glass into a sheet or plate and feed the same forward in horizontal position, heaters arranged above and below the course of said plate in proximity to the rolls and arranged to fire polish both surfaces of said plate, and reciprocating rubbing devices arranged in proximity to said heaters.

5. Apparatus for making polished glass, comprising a table, rolls coöperating therewith and arranged to form the molten glass into a sheet or plate, and feed the same forward in horizontal position, a heater above the course of said plate in proximity to the rolls and arranged to fire polish the upper surface of the plate, a reciprocating rubbing device above the course of the plate in proximity to said heater, a second heater arranged below the course of the plate in advance of said rubbing device, and a second rubbing device arranged below the course of the plate in proximity to said second heater.

6. Apparatus for making polished glass, comprising a table, rolls coöperating therewith and arranged to form the molten glass into a sheet or plate and feed the same forward in horizontal position, heaters in proximity to said rolls both above and below the course of said plate and arranged to fire polish both surfaces thereof, a bodily movable carrier for receiving said plate after it leaves said heaters, and means for delivering the plate to said carrier in a manner to prevent relative movement between plate and carrier.

7. Apparatus for making glass, comprising a tank provided with an orifice through which the molten glass escapes in a thin wide stream, of substantially the width of the desired plate rolls arranged to form said stream to a uniform thickness, heaters in proximity to said rolls and arranged to fire finish both surfaces of the plate before it cools, and annealing means.

8. Apparatus for making polished plate glass comprising a heater for fire finishing the lower surface of a substantially rigid plate, a flexible carrier arranged to move in line with the movement of said plate, mechanism for feeding the plate forwardly from said heater, and mechanism independent of the plate feeding mechanism for moving said flexible carrier along with the plate and at the same speed.

9. Apparatus for making polished plate glass, comprising a heater for fire finishing the lower surface of a substantially rigid plate, mechanism for feeding said plate over said heater, and a carrier for said plate comprising a series of sections jointed together and arranged to be moved into position below the line of travel of the plate and then to be moved to a horizontal position together with the plate and at the same rate of speed.

10. Apparatus for making polished plate glass, comprising a heater for fire finishing the lower surface of the glass, a sectional support composed of material non-abradent and non-adhesive to hot glass and arranged to receive the plate while still hot, a conveyer on which said support is mounted, and mechanism arranged to move said support onto said conveyer and in line with the movement of the plate.

11. Apparatus for making polished plate glass, comprising a heater for finishing the lower surface of a plate, a conveyer for said plate, a supporting surface on said conveyer composed of sections and movable partly off the conveyer to lie below and in the course of travel of the plate, and mechanism for moving said support onto the conveyer and at the same rate of travel as the plate.

12. Apparatus for making polished glass, comprising a heater for fire finishing the lower surface of the plate, a sectional carrier arranged to move in line with the line of movement of said plate, means for securing the end of the plate to said carrier, and means for moving said carrier at the same rate of travel as the plate to deliver the latter thereon.

13. Apparatus for making polished plate glass, comprising a heater for fire finishing the lower surface of the plate, a leer, a leer conveyer, and mechanism for delivering the plate to said conveyer in a manner to prevent relative movement between said plate and conveyer.

14. Apparatus for making polished plate glass, comprising a heater for fire polishing the lower surface of the plate, mechanism for moving the plate over said heater, a leer, a leer conveyer, and means on said leer conveyer movable thereon and in line with the line of movement of the plate and arranged to be brought out of horizontal and then moved back into horizontal position in the line of movement of the plate and at the same rate of speed.

15. Apparatus for making polished plate glass, comprising plate moving mechanism, fire finishing mechanism arranged to fire polish both surfaces of the glass, a conveyer, and means for delivering the plate to said conveyer and in a manner to prevent relative movement between plate and conveyer.

16. Apparatus for making polished glass, comprising in combination, plate moving mechanism, heaters arranged to fire finish both surfaces of said plate, a conveyer, and a support on said conveyer and movable thereoff to bring the same out of horizontal position and movable in the line of movement of the plate to bring the same into horizontal position and at the same rate of movement as said plate.

In testimony whereof, I have hereunto set my hand.

GEORGE C. DE BAY.

Witnesses:
F. W. WINTER,
JOHN S. CORT.